March 4, 1924. 1,485,988
H. MICHEL
ENGINE
Filed Oct. 20, 1922
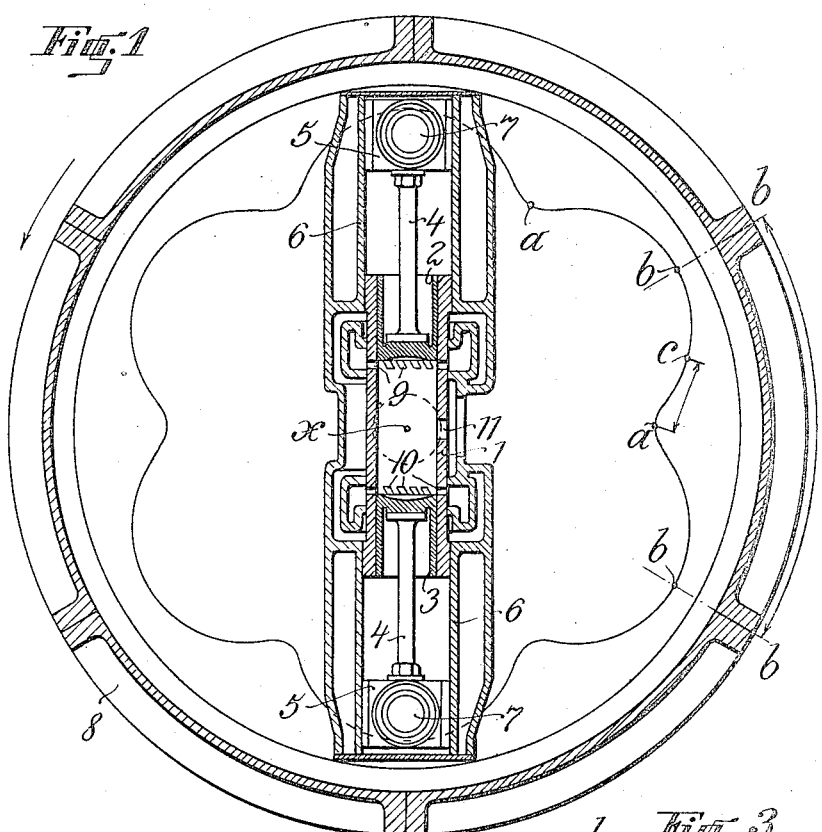
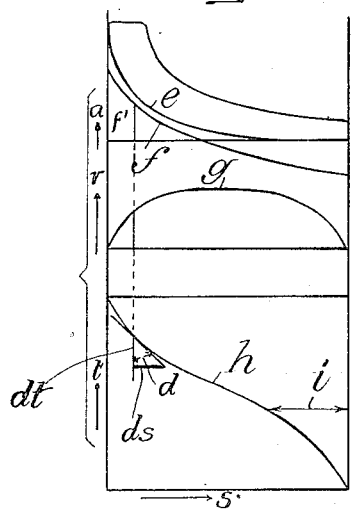
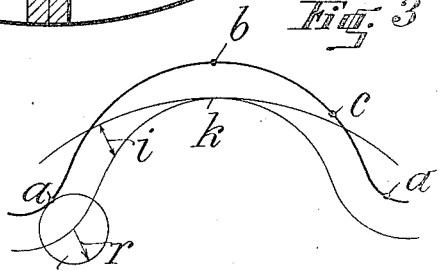
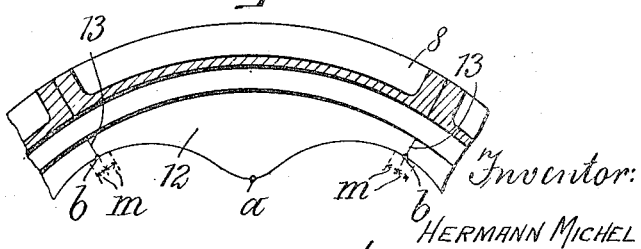
Inventor:
Hermann Michel Patented Mar. 4, 1924.

1,485,988

UNITED STATES PATENT OFFICE.

HERMANN MICHEL, OF VOORDE, HOLSTEIN, GERMANY.

ENGINE.

Application filed October 20, 1922. Serial No. 595,749.

*To all whom it may concern:*

Be it known that I, HERMANN MICHEL, a citizen of Germany, and resident of Voorde, Holstein, Germany, have invented certain new and useful Improvements in Engines (for which I have filed an application in Germany July 1, 1921), of which the following is a specification.

My invention relates to improvements in engines, and more particularly in engines comprising stationary cylinders and reciprocating pistons acting on a rotary member or fly wheel through the intermediary of cam mechanism, which type is used for example in two-stroke cycle internal combustion engines. In machines of this type the piston rods are preferably equipped with cross-heads carrying rollers acting on the cam face.

In engines of this type such as are now in use the cam faces have been designed without taking in regard the forces exerted by acceleration and retardation of the movable masses, and in designing the same exclusive attention has been paid to the cycle of the motive fluid within the cylinder. Therefore it has been necessary to provide double cam faces or guide ways, an inner one and an outer one, the rollers used in the transmission of the power alternately bearing on one or the other of the said guide ways. If for both guide ways a single roller is provided, the direction of the rotation of the roller is reversed as it passes from one guide way to the other one, which results in rapid wear of the roller and the guide ways. Furthermore, blows are thereby exerted by the rollers on the guide ways, because the relative distance of the guide ways is necessarily a little larger than the diameter of the roller, which blows by continuously acting at the same points hollow out the guide way, so that the blows gradually become heavier and thereby accelerate the wear of the cam face. Such blows also cause wear of the bearings of the rollers. Even if independent rollers are provided for each guide way, blows are not avoided, because it is impossible to provide guide ways which exactly correspond to each other, so that the rollers bear on the guide ways with the same pressure.

The change in the direction of the pressure is explained as follows: For example in a two-stroke cycle internal combustion engine, during the explosion stroke the roller is forced against the guide way by the pressure of the gas acting on the piston, and also during the first part of the compression stroke, the piston being accelerated from the guide way. But during the second part of the compression stroke the roller gets out of contact with the guide way when the retardation of the piston gearing caused by the compression of the charge is smaller than the retardation allowed by the corresponding section of the guide way designed merely according to the movement of the piston.

The object of the present improvements is to avoid the said objectionable features of the constructions of engines of the type referred to, and with this object in view I construct the cam face in such a way that the rollers carried by the cross-heads are always pressed against the cam face, and the retardation of the movable parts allowed by the cam face is always smaller than the retardation caused by the compression of the combustible mixture during the compression stroke. Therefore, during the whole length of the second section of the compression stroke the force transmitted by the combustible mixture to the piston exceeds the force exerted by the cam on the piston, and the retardation of the piston by action of these opposed forces is such that the rollers are held by the differential pressure in engagement with the cam, and the blows of the rollers on the cam are avoided.

In order that the invention may be more clearly understood an example embodying the same has been shown in the accompanying drawing, in which the same reference characters have been used in all the views to indicate corresponding parts. In said drawing, Fig. 1 is a diagrammatical sectional view of the engine, Figs. 2 and 3 are diagrams illustrating the designing of the cam faces, and Fig. 4 is a sectional view of a part of the rotary member showing a modification.

In the example shown in Fig. 1, the engine comprises a stationary cylinder 1 having two pistons 2 and 3 reciprocating therein, which pistons are connected by piston rods 4, 4 with cross-heads 5 mounted for reciprocation in a radial direction in suitable guide ways 6 and provided each with a roller 7 adapted to run on a cam made in six sections *b—a—b* each controlling one stroke of the cycle of a two-stroke cycle engine. The cam is formed on a rotary member or fly wheel 8 connected with the driven shaft (not shown).

The exhaust ports 9 are controlled by the piston 2 and the ports 10 for the admission of scavenging air are controlled by the piston 3. Fuel is supplied through an opening 11 made in the wall of the cylinder. Upon explosion the pistons 2 and 3 are thrown outwardly and with the rollers 7 into engagement with the sections *a—b* of the cam face, whereby the fly wheel 8 is driven in the direction of the arrow shown in Fig. 1. At the end of the stroke and during the compression stroke the rollers 7 bear on the cam face substantially while moving over the portion *b—c* thereof, because the pistons 2 and 3 and the parts 4, 5, and 7 must be accelerated by the pressure of the cam acting on the rollers 7. Substantially from the point *c* the accelerating forces of the said bodies exceed the pressure of the air supplied through the ports 10, so that the rollers would tend to recede from the cam face, unless regard has been paid to the acceleration in drafting the portion *c—a* of the cam.

The configuration of the portion *c—a* of the cam required for preventing receding of the rollers from the cam face is designed as follows: In the diagram shown in Fig. 2 line *e* represents the compression of the charge, the ordinates indicating the retarding forces acting on the pistons and the parts connected therewith. In my improved construction these retarding forces are always smaller than the retardation of the movable parts allowed by the portion *c—a* of the cam. Therefore, the said portion is designed according to an acceleration line *f* located below the line *e*. The accelerating forces transmitted from the cam section *b—c—a* to the movable parts during the first part of the compression stroke are represented in Fig. 2 by the portion of the line *f* located below the axis of abscissæ, and during the second part of the compression stroke the said forces are negative. Therefore, the portion of the line *f* located above the axis of abscissæ represents the retarding forces of the movable parts allowed by the part *c—a* of the cam face. As the line *f* is located below the line *e* the rollers 7 are forced during the second part of the compression stroke against the part *c—a* of the cam face with a force which corresponds to the length of the sections of the ordinates between the lines *e* and *f*. From the line *f* representing the acceleration the line *g* representing the velocity is developed by calculation and drafting by means of the general equation for energy, which is:

$$Fs = \tfrac{1}{2}mv^2$$

where $F =$ force
$s =$ distance and $m =$ mass and $v =$ velocity, but since F and *s* are variables, this equation becomes $$\int F ds = \tfrac{1}{2}mv^2$$

By substituting for the value F, the equivalents *ma*, from the force equation $$F = ma$$

where $a =$ acceleration the above equation becomes $$m \int a\, ds = \tfrac{1}{2}mv^2$$

From this equation, the value of *v* will be determined as follows:

$$v = \sqrt{2 \int a\, ds}$$

but since $\int a\, ds$ is the area of the portion under the curve *f* determined by the ordinate drawn any distance *s* from the left vertical line in Fig. 2, (this area at any given point may be called $f^1$, as shown in Fig 2) the value of *v* will be $$\sqrt{2f^1}.$$

The ordinate of the curve *g* then as shown in Fig. 2 will be equal to the square root of two times the area $f^1$ at the same distance *s* from the left hand vertical line. From the line *g* the line *h* representing the configuration of the cam face is developed. The curve *h* from which the cam surface is finally determined must satisfy the expression $$v = \frac{ds}{dt}$$

where $t =$ time $\frac{ds}{dt}$, however, is equal to the tangent of the angle formed between the vertical ordinate and the tangent to the curve *h* at any point arbitrarily selected on the curve *h* so that the curve *h* may be computed from the equation $$\frac{ds}{dt} = \tan \alpha \ (\text{see Fig. 2}).$$

Since the value *v* at any point *s* distant from the left hand vertical line in Fig. 2 on the curve *g* equals $\frac{ds}{dt}$, the tangent of the curve *h* at that same point may be determined, and thus by this means, the curve *h* may be constructed. Now since the velocity of the movable parts of the piston must be determined by the speed of rotation of a cam instead of by a cam traveling along a straight line the individual elevations $i$ of the line $h$ representing the cam face are drawn in radial direction inwardly and with the proper scale from a circle drawn about the center of rotation of the engine and having a radius corresponding to the outer dead center point. This results in the line $k$ showing the required path of the centers of the rollers 7. Circles drawn with the radius of the rollers about consecutive points of the line $k$ give the curve $a$—$b$—$c$—$a$ of the cam face.

The configuration of the cam face for the explosion stroke may be different from that of the compression stroke, but I prefer to construct the same as the reverse of the line of the compression stroke, and particularly so in case of reversible engines.

In this case the rollers 7 bear during both strokes of the pistons 2 and 3 on the cam face $a$—$b$—$a$, so that a single cam face is sufficient, which cam face is preferably disposed at the outer side of the rollers 7. Where in addition a similar guide way is provided at the inner side of the rollers, the said additional guide way is merely a safeguard in case of abnormal operation, for example when starting the engine, in which case no pressure due to explosion is transmitted to the pistons and the subsidiary cam face forces the pistons to move according to the main cam face.

Preferably the velocity imparted to the pistons 2 and 3 is as high as possible in order to obtain high power with small cylinders. The velocity of the pistons which can be attained is increased as the inclination of the line $f$ of the acceleration is increased. However, in order to insure contact between the rollers and the cam face the said line should not intersect the line $e$ representing the compression. Therefore the maximum of the velocity is attained if the line $f$ representing the acceleration is disposed closely below the line of compression $e$ and so as to follow the same as closely as possible.

In the example shown in Fig. 4 the sections of the fly wheel equipped with the cam way $b$—$c$—$a$ are composed of segments 12 rigidly connected with the fly wheel. Thereby the cam way can be easily manufactured and set in exact position. The joints 13 of the segments are located at the points $b$ of the cam way $b$—$c$—$b$, that is at those parts which correspond to the outer dead centers of the piston strokes. The portions of the segments adjacent to the said joints are constructed along circles drawn about the center of rotation $x$ of the fly wheel 8.

Shortly before the end of the explosion stroke the exhaust ports 9 and the scavenging ports 10 are opened by the pistons 2 and 3, so that the pressure within the cylinder corresponds to that of the scavening air. Therefore at the end of the explosion stroke and at the beginning of the compression stroke, and when the rollers pass from one segment 12 to the adjacent one, the pressure on the cam face is small. Furthermore it is an important feature that no accelerating forces are exerted by the pistons 2 and 3 on the joints 13, because, by reason of the configuration of the cam way portions $m$, centered at $x$ the said pistons perform no radial movement when passing from one segment 12 to the adjacent one.

In some cases I construct the portions $m$ of the cam way along a circle having its center near the center $x$ of the fly wheel 8, instead of exactly at such center.

While in describing the invention reference has been made to particular examples embodying the same I wish it to be understood that my invention is not limited to the constructions shown in the drawings, and that various changes may be made in the general arrangement of the machine and the construction of its parts without departing from the invention.

I claim:

1. In a machine, the combination, with a cylinder, and a piston reciprocating therein, of a cam member cooperating with said piston to control the reciprocating movement thereof, said cam member and cylinder being movable relatively to each other, the configuration of the cam face of said cam member being such that the acceleration of the piston caused by the cam member is smaller at any part of the movement of the piston than the retardation of the piston caused by other forces acting thereon.

2. In an engine, the combination, with a stationary cylinder, a piston movable therein, and means to supply pressure fluid to said cylinder for performing the pressure stroke and to allow said fluid to be compressed during the return stroke, of a movable cam member cooperating with said piston for controlling the reciprocating movement thereof, the configuration of the cam face of said member being such that at any part of the movement of the piston the acceleration of the piston caused by the cam member is smaller than the retardation caused by the fluid during the compression thereof.

3. In an engine, the combination, with a stationary cylinder, a piston movable therein, and means to supply pressure fluid to said cylinder for performing the pressure stroke and to allow said fluid to be compressed during the return stroke, of a rotary cam member surrounding said cylinder and cooperating with said piston for controlling the reciprocating movement thereof, the configuration of the cam face of said member being such that at any part of the movement of the piston the acceleration of the piston caused by the cam member is smaller than the retardation caused by the fluid during the compression thereof.

4. In an engine, the combination, with a stationary cylinder, a piston movable therein, and means to supply pressure fluid to said cylinder for performing the pressure stroke and to allow said fluid to be compressed during the return stroke, of a movable cam member cooperating with said piston for controlling the reciprocating movement thereof, the configuration of the cam face of said member being such that at any part of the movement of the piston the acceleration of the piston caused by the cam member is smaller than the retardation caused by the fluid during the compression thereof, said cam member being made in sections the joints of which are located in positions corresponding to the dead points of the engine and having the parts of the cam faces adjacent to the joints formed along circles having their centers coinciding with the centers of the cam member.

In testimony whereof I hereunto affix my signature.

HERMANN MICHEL.